United States Patent [19]

Green

[11] 3,840,696

[45] Oct. 8, 1974

[54] SINGLE TUBE COLOR TELEVISION CAMERA WITH RECOVERY OF INDEX SIGNAL FOR ELEMENTAL COLOR COMPONENT SEPARATION

[75] Inventor: Ian MacDonald Green, Buckie, Scotland

[73] Assignee: EMI Limited, Middlesex, England

[22] Filed: Sept. 26, 1972

[21] Appl. No.: 292,436

[30] Foreign Application Priority Data

Oct. 8, 1971 Great Britain .................. 46845/71

[52] U.S. Cl. .......................................... 358/45

[51] Int. Cl. .......................................... H04n 9/06

[58] Field of Search .......................................... 178/5.4 ST

[56] References Cited

UNITED STATES PATENTS

| | | | |
|---|---|---|---|
| 3,502,799 | 3/1970 | Watanabe | 178/5.4 ST |
| 3,526,706 | 9/1970 | Watanabe | 178/5.4 ST |
| 3,548,088 | 12/1970 | Shimada et al. | 178/5.4 ST |
| 3,560,637 | 2/1971 | Takeuchi et al. | 178/5.4 ST |
| 3,647,945 | 3/1972 | Hannan | 178/5.4 ST |
| 3,647,947 | 3/1972 | Eto et al. | 178/5.4 ST |
| 3,655,909 | 4/1972 | Kubota | 178/5.4 ST |

*Primary Examiner*—Robert L. Richardson
*Assistant Examiner*—George G. Stellar
*Attorney, Agent, or Firm*—Fleit, Gipple & Jacobson

[57] ABSTRACT

A colour television camera is disclosed which includes a pickup tube and a striped optical colour filter disposed in the path of light incident on the tube. Scansion of the target of the tube by means of the electron beam thereof is arranged to liberate a signal, in the form of a modulated carrier oscillation which is indicative of colour information derived from the viewed scene, and the phase of the signal in relation to a reference signal represents hue. The invention resides in providing said reference signal in such a way that effects of variations in the frequency of said carrier oscillations (due to variations in the rate of scansion, pitch of filter stripes, etc.) can be compensated by reproducing said variations in the reference signal.

2 Claims, 9 Drawing Figures

COLOURS SHOWN ARE TRANSMITTED

Figure 1:
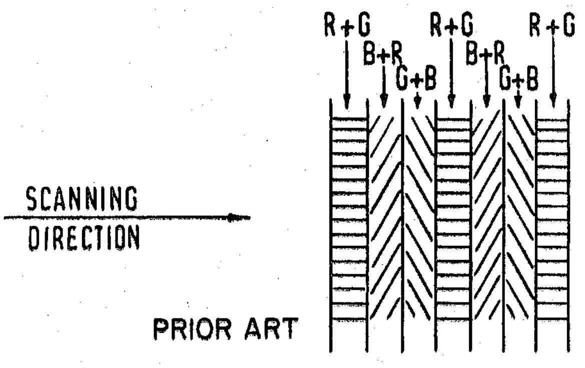

SINGLE TUBE COLOR TELEVISION CAMERA WITH RECOVERY OF INDEX SIGNAL FOR ELEMENTAL COLOR COMPONENT SEPARATION

The present invention relates to colour television cameras, and it relates more particularly to such cameras of the kind in which a striped optical colour filter is disposed so as to be in the path of light incident upon the camera tube and so that the stripes are in focus at the photo-sensitive surface of the tube.

Such cameras can be operated so that by scanning with respect to said surface by means of the electron beam of the tube there is liberated a signal indicative of colour information of the viewed scene in which the phase of the signal in relation to a reference represents hue. Said signal is in the form of a modulated carrier oscillation and the frequency of the carrier is dependent upon the rate of the scanning and other factors. On this account non-linearity of scanning gives rise to variations of the carrier frequency, as does departure from regularity of the stripe pattern. In order that the colour information carried by the signal can be utilised it is necessary to employ decoding by multiplicative detection using a reference oscillation which varies in the course of scanning in the same way as does the colour carrier signal. If a reference oscillation of fixed frequency is employed then intolerably large errors in hue tend to occur in practice. It is an object of the invention to provide a reference oscillation which varies in the course of scanning in sympathy with the carrier as indicated.

It has been proposed to provide a reference oscillation by using additional stripes in the filtering, which stripes may consist simply of neutral density stripes alternately absorbing light to greater and lesser extents. If the additional stripes are superimposed upon the colour stripes then a problem tends to arise by virtue of intermodulation between the two stripe patterns so tending to cause disturbance of the luminance signal and of the colour carrier signal. It is an object of the invention to overcome or reduce this difficulty.

There is claimed in British Patent 1,246,904 a colour video signal generating apparatus comprising image pickup means having scanning means and being operative to photoelectrically convert light projected on the image pickup means into an electrical output composed of successive signals corresponding to the intensities of light successively encountered by said scanning means in a line scanning direction, filter means interposed optically between an object to be televised and said image pickup means and having several regions respectively selecting light of different wavelength ranges for dividing an image of the object to be televised, which is projected on to said image pickup means, into respective colour component strips each cyclically occurring with the same space frequency, means for forming on the image pickup means bright and dark stripes of two difference space frequencies different from that of said colour component stripes, means for deriving from the output of the image pickup means a beat signal corresponding to the frequency difference between said two bright and dark stripe space frequencies, and means for obtaining colour component signals from the output of the image pickup means corresponding to the colours of said colour component stripes, which latter means uses said beat signal as the demodulating reference signal. This proposal is also directed to solving the problem of intermodulation but is based on the use of a striped colour filter which is remote from the photosensitive surface of the pickup tube and possibly also on the use of a cylindrically lenticulated screen interposed between the filter and said surface. It is a further object of the present invention to avoid intermodulation difficulties without recourse to a remote colour filter as proposed in British Patent 1,246,904 or a lenticulated screen.

According to the invention there is provided a colour television camera including a pick-up tube having a light sensitive target which is exposed to incident light from a scene to be televised, means for scanning said target in a predetermined manner to derive output signals from said pick-up tube, filter means arranged in the path of said incident light to said target including sets of elements of three different colours sufficient to determine the hue of the incident light, the sets being cyclically repeating such that said output signals include a carrier wave, of frequency determined by the cyclic repetition of said sets and by the scanning, the phase of said carrier wave being indicative of the hue of said incident light, the filter means incorporating a further set of cyclically recurring elements, some of which may be common to the first mentioned sets, so spatially positioned in relation to the first mentioned sets that said output signals include also indexing information, characterized by its frequency from said carrier wave, circuit means adapted to receive said output signals and to separate the indexing information from the carrier wave, further circuit means for deriving from said indexing information an index signal at the frequency of said carrier wave, and means for utilising said index signal to derive the hue information from said carrier wave.

It will be appreciated that the colour signals derived from a camera of the above kind are not precisely in the form of chrominance signals of the kind transmitted in accordance with the PAL or NTSC colour television systems. However by deriving quadrature components of said colour carrier wave so as to provide two linear functions of colour signals relative to the primaries of colour analysis, and using also a luminance signal derived from said tube, this signal constituting a further linear function of the latter colour signals, and applying these derived signals to suitable matrixing circuits, signals indicative of the red, green and blue colour components respectively of said colour analysis can be derived. These signals may then be treated as the R, G and B signals from a three-tube camera and applied to standard matrixing circuits. The luminance signal transmitted by the system may be the luminance signal as derived from the camera.

Figure 2:
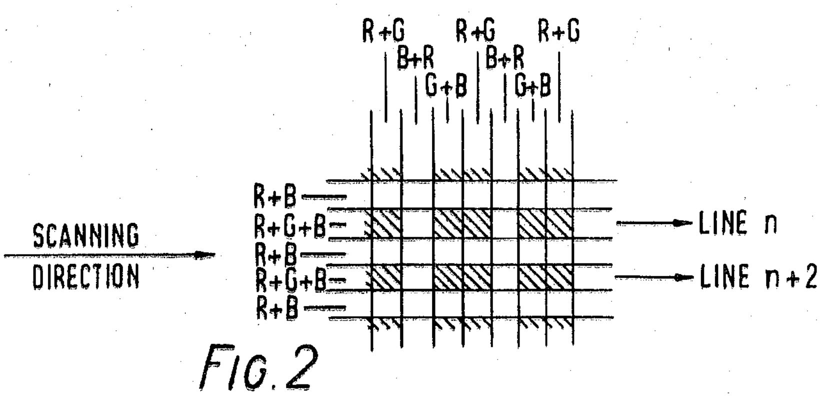
Figure 3:
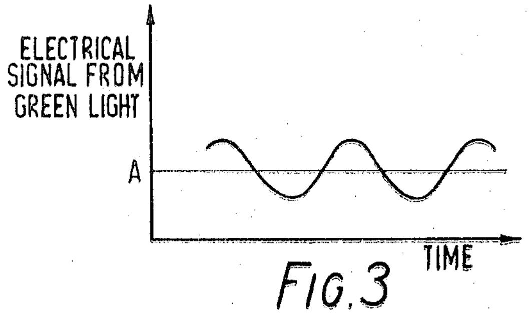
Figure 4:
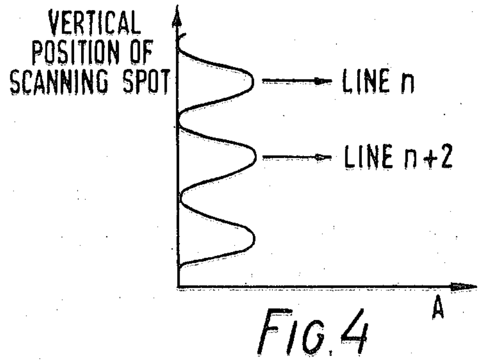
Figure 5:
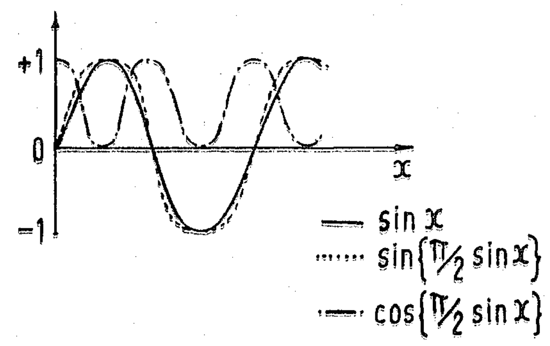
Figure 6:
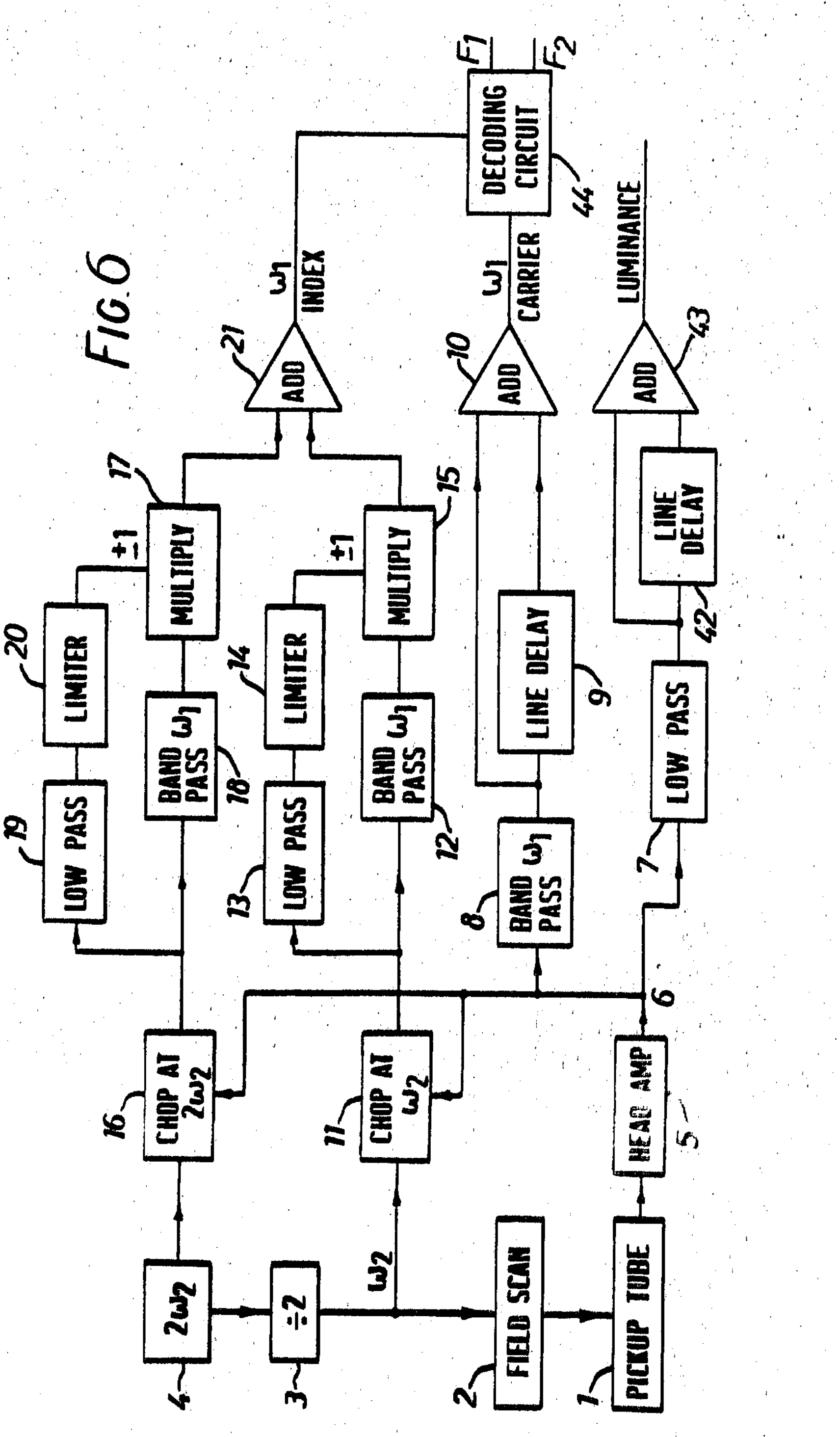
Figure 8:
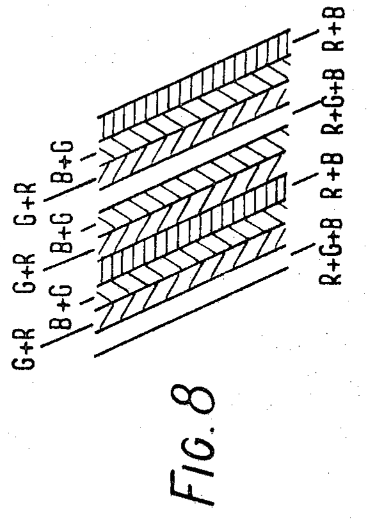
Figure 7:
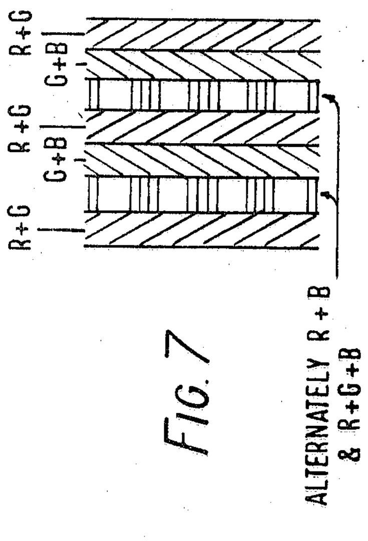
Figure 9:
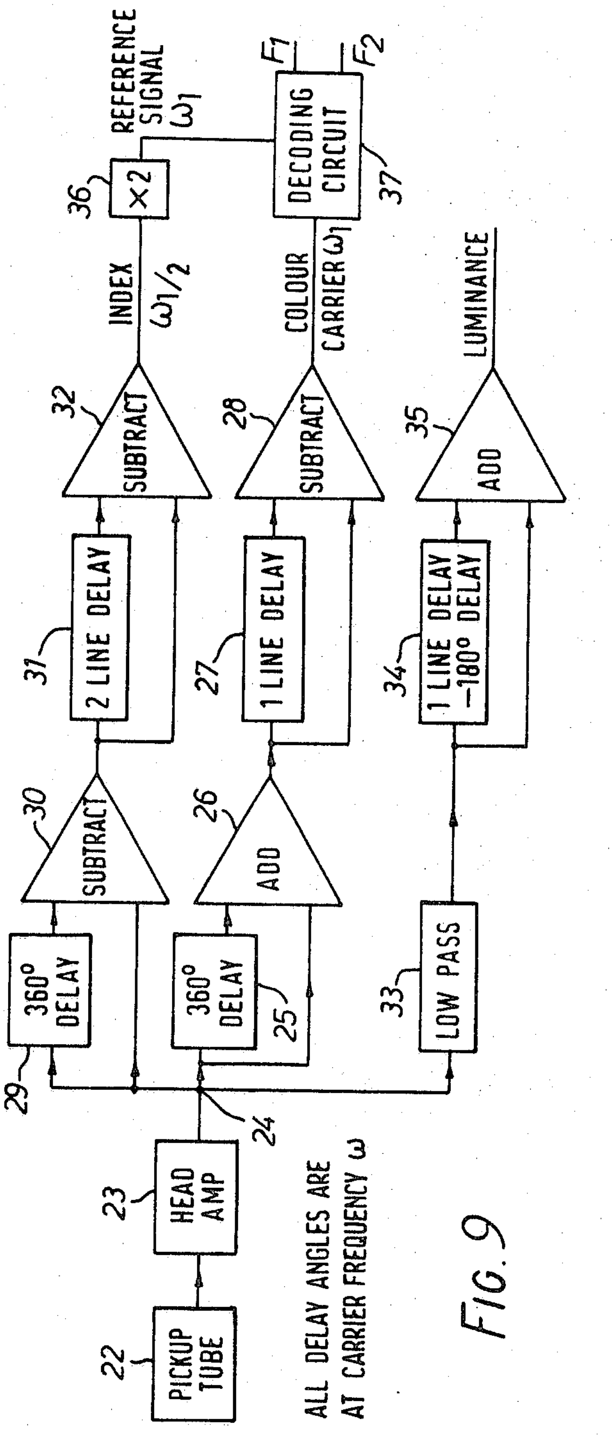

In order that the invention may be clearly understood and readily carried into effect, the same will now be described in terms of specific embodiments with reference to the accompanying drawings of which:

FIG. 1 shows part of a colour filter of known kind,

FIG. 2 shows part of a colour filter suitable for use in a colour television camera according to the invention, FIGS. 3 to 5 inclusive represent waveforms explanatory of the invention, FIG. 6 shows, in block diagrammatic form part of the circuits of a colour television camera according to one example of the invention, FIG. 7 shows part of an alternative colour filter to that shown in FIG. 2, FIG. 8 shows part of a colour filter suitable for use in a camera according to an alternative form of the invention, and FIG. 9 shows, in block diagrammatic form, part of the circuit of a colour television camera according to said alternative form of the invention.

Referring now to the drawing, FIG. 1 shows part of a known kind of colour filter. The filter comprises stripes which are orthogonal to the line scanning direction of a pickup tube, on the light sensitive target of which light is allowed to be incident via the filter. The stripes are alternately yellow, magenta and cyan repeating in regular fashion so as to intercept respectively blue, green and red components of the incident light. Thus it will be seen that light of different spectral compositions is allowed to be incident on respective parts of the target, the parts in this case being vertical stripes. The parts for light of each spectral composition are disposed in a regular positional sequence, the spacing between the adjacent parts for any one of the spectral compositions being equal. The target is scanned by an electron beam in the usual way, and colour information is thereby modulated on a carrier as a colour carrier signal, or colour carrier wave, the period of which corresponds to the spacing between adjacent stripes of light of each spectral composition as focused on the target of the pickup tube.

White light, as composed of equal components in red, green and blue, produces no nett carrier (zero modulation). Where the light exhibits a nett colour, however, the modulated carrier phase is determined by the hue of the light, and its amplitude by the differently intense colour components of the light.

As has been indicated in order to decode the modulated carrier information, a signal of reference phase is required. The phase difference between the reference signal and the carrier signal then contains the hue information which having thus been ascertained can be transmitted by the system.

The establishing of a reference phase signal as required can be achieved, in a camera according to one example of the invention, by utilising a form of filter different from the simple form of FIG. 1, and as shown in FIG. 2 in which a second filter is effectively superimposed on the filter of FIG. 1. Alternatively, two separate filters could be used. Referring now to FIG. 2, it will be noted that a second set of of stripes is effectively superimposed on a first set, the first set corresponding to the set of FIG. 1 and the second set being orthogonal to the first and therefore parallel to the line scanning direction. The additional information made available by the second set of stripes includes a signal which can be separated and can be used as said reference signal.

In one example, the horizontal stripes (the second set) are alternately transparent and green absorbing. Then, whereas red or blue light alone will form on the target a regular pattern of vertical stripes which when scanned produce the carrier signal, as referred to above, green light will form a different pattern, that shown shaded in FIG. 2. The pattern is regular and is present and absent alternately on adjacent horizontal stripes. The field scan of the pickup tube is made such that the pitch of the scanning lines, i.e., that of two scanning lines which are consecutive in time, is equal to the width of a horizontal stripe, and the width of each scanning line is also equal to the width of a horizontal stripe. To allow for the suppression of green light due to the presence of the horizontal green absorbing stripes, it is arranged that twice as much light is transmitted by the vertical green transmitting stripes, and the signals of consecutive horizontal scans are added by delay line technique so that on average the colour balance is restored and the colour carrier signal vanishes on white which otherwise it would not do. Thus the sum of the signals derived from two consecutive lines is made to provide the colour information in similar form to that envisaged in relation to FIG. 1.

When scanning along a transparent horizontal stripe, the electrical signal obtained from green light is a carrier oscillation as shown in FIG. 3. Here it is assumed that the second and higher harmonics of the carrier oscillation frequency are suppressed so that the signal may therefore be described by an equation of the form:

$$S_G = A\,[1 + a\sin(\omega_1 t + \phi_1)] \qquad (1)$$

where $\omega_1$ is the carrier frequency, $\sin(\omega_1 t + \phi_1)$ is of the nature of the required reference signal, $a$ is a constant dependent upon the resolution of the tube and $A$ is the effective level of green sampled light.

The exact value of $A$ depends upon the registration of the horizontal scan with the horizontal stripes, and the signal may vanish entirely when scanning precisely along a horizontal stripe from which green has been absorbed. For the purpose of the following calculation, $A$ is assumed to vanish in this way, and it is also assumed as a convenient approximation that, in different vertical positions of the scanning spot, for which $A$ takes on different values, these values are distributed (as shown in FIG. 4) in a sinusoidal manner, the period being of two horizontal stripe widths. Let the vertical position of the scanning spot be $d$, measured from the centre of a transparent stripe. Then $$A = \tfrac{1}{2}A_o\,[1 + \cos(2\pi d/p)] \qquad (2)$$

where $p$ is the pitch of horizontal transparent stripes, and $A_o$ represents the level of green light incident on the horizontal stripes.

Combining Equations 1 and 2 to give an expression for the electrical signal $S_G$ produced by green light:

$$S_G = \tfrac{1}{2}A_o\,[1 + \cos(2\pi d/p)]\,[1 + a\sin(\omega_1 t + \phi_1)] \qquad (3)$$

Now suppose that the scanning spot is wobbled vertically at a frequency $\omega_2$ during each forward line period, the wobble being in phase from line to line. If the wobble amplitude peak to peak is of line width, i.e., ½ $p$, then at any instant $d$ is specified in general by the expression:

$$d_o + \tfrac{1}{4}p\sin(\omega_2 t + \phi_2)$$

where $d_o$ is the vertical position before application of spot wobble. This wobble amplitude is sufficient to ensure that the signal output is modulated in response to the full vertical modulation of the filter for green light.

Substituting for $d$ in (3) above $$S_G = \tfrac{1}{2} A_o [1 + \cos(2\pi d_o/p) + \pi/2 \sin(\omega_2 t + \phi_2)][1 + a \sin(\omega_1 t + \phi_1)] = \tfrac{1}{2} A_o\{1 + \cos 2\pi d_o/p \cos[\pi/2 \sin(\omega_2 t + \phi_2)] - \sin 2\pi d_o/p \sin[\pi/2 \sin(\omega_2 t + \phi_2)]\}[1 + a \sin(\omega_1 t + \phi_1)]$$

As illustrated in FIG. 5, the expression $\sin[\pi/2 \sin(\omega_2 t + \phi_2)]$ may be approximated by $\sin(\omega_2 t + \phi_2)$. Similarly $\cos[\pi/2 \sin(\omega_2 t + \phi_2)]$ may be approximated by $\tfrac{1}{2}(\cos 2(\omega_2 t + \phi_2) + 1)$ so that $$S_G = \tfrac{1}{2} A_o [1 + \tfrac{1}{2} \cos 2\pi d_o/p + \tfrac{1}{2} \cos 2\pi d_o/p \cos 2(\omega_2 t + \phi_2) - \sin 2\pi d_o/p \sin(\omega_2 t + \phi_2)][1 + a \sin(\omega_1 t + \phi_1)] \quad (4)$$

Additionally the signal $S_G$ is chopped, that is the amplitude of the signal $S_G$ is sampled in the manner of synchronous detection with appropriate timing, at the spot wobbling frequency $\omega_2$, to provide the magnitude of the factor multiplying the component signal of frequency $\omega_2$ in Equation 4 above. This magnitude is:

$$-\tfrac{1}{4} A_o \sin 2\pi d_o/p \, [1 + a \sin(\omega_1 t + \phi_1)].$$

The sign of the term $-\tfrac{1}{4} A_o \sin 2\pi d_o/p$, which is a low frequency term with respect to $d_o$, is the sign of the signal component corresponding to the term a $\sin(\omega_1 t + \phi_1)$. By changing the sign of this last component if the low frequency term is negative there is obtained a signal $$|\tfrac{1}{4} A_o \sin 2\pi d_o/p| \, [a \sin(\omega_1 t + \phi_1)] = S_1$$

This is a signal of the nature of the required reference signal. It will, however, be evanescent if either $A_o$ or $\sin 2\pi d_o/p$ approaches zero. To avoid the former situation, a bias light, illuminating the target of the pickup tube, is provided to ensure an adequate light level at all times. By chopping the signal $S_G$ so as to detect synchronously at frequency $2\omega_2$ there is similarly provided a signal:

$$|\tfrac{1}{8} A_o \cos 2\pi d_o/p| [a \sin(\omega_1 t + \phi_1)] = S_2$$

which again is of the nature of the required reference signal. Adding the two signals $S_1$ and $S_2$ ensures that a reference signal of the required form is continuously available, since $\sin 2\pi d_o/p$ and $\cos 2\pi d_o/p$ do not disappear simultaneously.

This expedient makes it unnecessary to control the position of the scanning lines in relation to the position of the horizontal stripes.

It will be evident that the pickup tube and its associated head amplifier must be such as to be able to operate with signals of frequency at least as high as $2\omega_2 + \omega_1$.

The value of $\omega_1$ could typically be 4MHz. The value of $\omega_2$ may be chosen to be higher or lower than $\omega_1$. In either case care must be taken in the filtering of the output of the synchronous detection circuits to secure the final output of signals of frequency $\omega_1$, namely signals of the nature of the required reference signal. The value of $\omega_2$ may be 1 MHz. If the value of $\omega_2$ is less than $\omega_1$ then interference components of fundamental frequency $\omega_2$ will tend to appear in the luminance channel assuming that the luminance signal is provided by a 9 suitable low pass filter filtering the output of said head amplifier. In these circumstances the interference components can be substantially cancelled by a summation process as between consecutive line scans.

FIG. 6 shows in block diagrammatic form, the processing circuits required to provide the reference signal.

A pickup tube shown at 1 has a field scan circuit 2 which is controlled to effect a vertical spot wobble at frequency $\omega_2$ by the output of a divide-by-two circuit 3. The circuit 3, in turn, is fed from a generator 4 which produces oscillations at a frequency of $2\omega_2$.

Signals derived from the pickup tube are applied via a head amplifier 5 and a junction 6 to a low pass filter 7, having a cut-off just below the frequency $\omega_1$, to provide at its output a luminance signal which is a linear function of R, G and B. Said luminance signal is fed to a one line delay component 42, the input and output of which are applied to the input of an adding circuit 43, which supplies a luminance signal substantially free of the interference components earlier mentioned by virtue of consecutive line cancellation. In this way any disturbing effect due to the intermodulation between vertical and horizontal stripes is reduced or avoided. Junction 6 is also connected to the input of a filter 8, which is a band pass filter centred on the frequency $\omega_1$ and feeds, on the one hand directly and on the other hand via a one line delay component 9, an adding circuit 10, thereby to establish the required colour carrier signal of frequency $\omega_1$ in which the light absorbing effect of the horizontal green absorbing stripes is compensated to restore the colour balance of the colour carrier signal so that the signal vanishes on white. In this way the intermodulation disturbance of the colour carrier signal is compensated. Junction point 6 is also connected to one input of a chopping circuit 11, which chops at the frequency $\omega_2$ under the control of signals from circuit 3. Output signals from circuit 11 are fed both via a filter 12, which is a band pass filter centred about the frequency $\omega_1$, and via a low pass filter 13 excluding frequencies such as $\omega_1$ and $\omega_2$, and a limiter 14 to a sign-changing circuit 15. Components 13 and 14 are effective to derive the sign of the low frequency component $-\tfrac{1}{4} A_o \sin 2\pi d_o/p$ of the signal $S_1$ referred to earlier. The signal applied to sign-changing circuit 15 from filter 12 is proportional to $\sin(\omega_1 t + \phi_1)$ and corresponds to the signal $S_1$. The latter signal appears at the output of circuit 15.

Junction point 6 is further connected to an input of a second chopping circuit 16, which chops at the frequency $2\omega_2$ under the control of generator 4. Chopping circuit 16 is coupled to a sign-changing circuit 17 via two paths, similar to those described for coupling chopping circuit 11 to sign-changing circuit 15. One path is via a band pass filter 18 having a pass band centred about the frequency $\omega_1$, and the other is via a low pass filter 19 excluding frequencies such as $\omega_1$ and $\omega_2$, and a limiter 20. The output of the circuit 17 is the signal $S_2$ referred to earlier. Thus the outputs of circuits 15 and 17 represents $S_1$ and $S_2$ respectively, and these are added in an adding circuit 21 to provide the required reference signal of frequency $\omega_1$. This reference signal may be contaminated to some degree by picture component interference as will be appreciated from Equation 4 taking into account the fact that in practice the simple $A_o$ term will be a time function representing picture information. If such contamination is not negligible then as will also be appreciated from Equation 4 it may be cancelled by one line delay methods using subtraction. This is based on the principle that the functions cos $2\pi d_0/p$ and sin $2\pi d_0/p$ reverse signs from line to line. The cancellation must be performed before separation of the reference signal component but not before separation of the colour carrier signal, or the luminance signal.

It will be appreciated that the required reference signal could be produced if desired by horizontal blue or red absorbing stripes rather than green.

The reference signal as produced in the output of the adding circuit 21 may be used to decode the colour carrier signal appearing in the output of the adding circuit 10 by means of decoding circuit 44.

This last circuit may consist of a quadrature demodulator pair of circuits of known kind so as to generate respective signals $F_1$ and $F_2$ relating to the quadrature axes. As indicated earlier these two signals together with the luminance signal from the adding circuit 43 may be employed to derive red, green and blue signals respective to the primaries of analysis. These signals may then be used as required by the system.

Instead of using a filter of the kind shown in FIG. 2, the vertical stripes may be modified as shown in FIG. 7. In this case the arrangement is such that green light can be incident on the target in all regions except those indicated in FIG. 7 by horizontal shading. The overall pattern of green light on the target is therefore similar to that described above with regard to the formation of the reference signal. The difference lies in that, instead of green light being absorbed by alternate horizontal lines of the filter as in FIG. 2, it is transmitted continuously on every alternate horizontal line and discontinuously on the interleaving horizontal lines. The filter of FIG. 7 is preferred to the kind shown in FIG. 2 since the luminance signal as derived at the output of adding circuit 43 can then be a better approximation to a true luminance signal than when a filter of the kind shown in FIG. 2 is used.

With the filter of FIG. 7 the reference signal component in the output of the pickup tube is present and absent on alternate lines exactly as with the filter of FIG. 2, but whereas with the latter filter the component is absent by reason of the suppression of green light by the horizontal green absorbing stripes, with the filter of FIG. 7 the component is absent because there is no suppression of green light along corresponding scans. Considerations of colour balance so that the colour carrier signal vanishes on white are the same as with the filter of FIG. 2.

According to an alternative form of the invention, a colour television camera includes a filter in which the vertical colour stripes which generate the colour carrier are modified by omitting certain stripes. For example, every other green absorbing stripe may be replaced by a transparent stripe. In this configuration the colour carrier signal may with advantage be phase alternated from line to line by placing the stripes at an angle in known manner, as shown in FIG. 8. Such phase alternation, as is commonly known, reduces interference patterning. Thus the inclination should be such as to displace the triplets by one half triplet pitch in consecutive scanning lines.

The effect of omitting every other green absorbing stripe is similar to that of removing every other cycle of the green component of the carrier. It halves the green component at the carrier frequency and simultaneously introduces an index component at half that frequency which serves to provide a reference signal, which half triplet frequency component can be derived from a selective filter. If twice as much green light as red or blue is passed to the striped filter from white light, equal carrier components are produced from red, green and blue light, as required so that the colour carrier vanishes on white.

A circuit for deriving the reference signal from signals derived from a pickup tube on which light is incident via a filter of the kind shown in FIG. 8, is shown in FIG. 9, the stripes being inclined as indicated to produce said phase alternation. Signals derived from a pickup tube 22 are fed via a head amplifier 23 to a junction point 24. In order to isolate the colour carrier signal from the reference signal the signal at 24 is delayed by one period (i.e., 360°) of the colour carrier frequency $\omega_1$ in a circuit 25 and added in circuit 26 to the undelayed signal. Any components at half the carrier frequency that is to say at the index signal frequency are thereby cancelled. Then to remove luminance information and making use of the phase alternation, information sequences derived from alternate lines by passing the output of circuit 26 both directly and via a one line period delay component 27 are subtracted in a subtractor 28. The output from 28 is the colour carrier signal.

The index signal, at half the carrier frequency, is derived by subtracting the signal appearing at point 24 from that delayed in a delay component 29, by means of the subtractor 30. The delay of the delay component 29 is that of 360° at the frequency $\omega_1$ of the colour carrier. As the output signal from subtractor 30 reverses in phase every two lines, a two line delay component 31 is used to improve rejection of picture information at the reference signal frequency. The output of circuit 30 is subtracted from that of component 31 in a subtraction circuit 32. As previously mentioned, a bias light is used to ensure continuous provision of the index signal. The reference signal is provided by frequency doubling of the index signal in the doubling circuit 36.

It is necessary to remove the index signal from the luminance signal which is derived via a low pass filter 33 from point 24. By adding, in circuit 35, the information derived from one line to that derived from a delay component 34 imparting to signals applied thereto a delay of one line period less 180° at the carrier frequency $\omega_1$, the index signal is cancelled, leaving luminance information in a frequency band up to the carrier frequency $\omega_1$.

The reference signal produced by the frequency doubling circuit 36 may be applied to the decoding circuit 37 to decode the colour carrier signal as produced by the subtraction circuit 28 in manner similar to that described with respect to the circuit of FIG. 6.

In a variant of the embodiment of the invention described with reference to FIG. 8 the respective sequence of red absorbing, green absorbing and blue absorbing stripes is such that none of the stripes is contiguous, but between each there is interposed a neutral density stripe, these stripes alternating in density through their sequence so that one is largely attenuating of the light and the next is substantially non-attenuating. The reference component in the video signal output of the tube is in these circumstances not of one half the colour carrier signal frequency, as in the scheme of FIG. 8, but rather three halves of this frequency. The required reference signal of colour carrier frequency can, however, be derived from the reference component by known methods.

In any of the embodiments of the invention it is not necessary that the widths of the colour absorbing stripes of one spectral characteristic should be equal to the widths of the colour absorbing stripes of another spectral characteristic, provided that the reproduced hues are not materially disturbed.

What I claim is:

1. A colour television camera including a pick-up tube having a light sensitive target which is exposed to incident light from a scene to be televised, means for scanning said target in a predetermined manner to derive output signals from said pick-up tube, filter means arranged in the path of said incident light to said target including sets of elements of three different colours sufficient to determine the hue of the incident light, the sets being cyclically repeating such that said output signals include a carrier wave, of frequency determined by the cyclic repetition of said sets and by the scanning, the phase of said carrier wave being indicative of the hue of said incident light, the filter means incorporating a further set of cyclically recurring elements, some of which may be common to said first mentioned sets, so spatially positioned in relation to the first-mentioned sets that said output signals include also an indexing signal, of half the frequency of said carrier wave, circuit means, adapted to receive said output signals and to separate the indexing signal from the carrier wave, including a subtracting circuit and a delay component arranged to impart to said output signals a delay corresponding to 360° at the frequency of said carrier wave, the subtracting circuit being arranged to receive, over separate connections, said output signals directly and after their passage through said delay component and to form the difference between the direct and delayed signals, further circuit means for doubling the frequency of said indexing signal and means for utilising the frequency doubled signal to derive the hue information from said carrier wave.

2. A camera according to claim 1 wherein all of said sets of elements constitute stripes inclined to the line scanning direction of said pick-up tube at such an angle to cause the carrier wave to change in phase through 180° from line to line.

* * * * *